Aug. 31, 1965              J. A. RAINES              3,203,372

RACK FOR SUPPORTING AND COOLING BAKERY PRODUCTS

Filed Sept. 12, 1963

INVENTOR.
JAMES A. RAINES

BY

Newton, Hopkins & Jones
ATTORNEYS ately and inexpensively manufactured.

United States Patent Office
3,203,372
Patented Aug. 31, 1965

3,203,372
RACK FOR SUPPORTING AND COOLING BAKERY PRODUCTS
James A. Raines, 1505 N. Elam St., Greensboro, N.C.
Filed Sept. 12, 1963, Ser. No. 308,527
4 Claims. (Cl. 108—24)

This invention relates to supporting racks and more particularly, to a rack for supporting cakes, pastries and other relatively light items for cooling.

Cakes, pastries and similar items are customarily cooled in the air after baking. Since such items have a tendency to crumble or break or are soft and sticky until cooled, they generally require flat firm support while cooling. In the past, this support for cakes, pastries and similar items while cooling has been provided by solid plates or open mesh grills.

Solid plates have not been a satisfactory means for supporting cakes, pastries and similar items while cooling because they prevent the free flow of air on all sides of an item and because the conducting properties of the solid plate tend to cause uneven or improper cooling. The open mesh grills which have previously been used have been characterized by rather large mesh openings which have not provided uniform support to an item being cooled and have permitted the item to crumble through the mesh openings. Moreover, the large mesh openings have supported the weight of an item along relatively widely separated lines of support and this has caused undesirable indentations and markings in the item.

Previous open mesh grills which have attempted to avoid these problems with mesh approaching the texture of screening have tended to lack the strength to support relatively heavy items such as cakes and have tended to be difficult to clean, and as a result they have rarely been used to support cakes, pastries and similar items. Moreover, all previous open mesh grills have generally been constructed as single integral units. Thus, when the wire mesh becomes damaged or otherwise unsatisfactory for use in supporting cakes, pastries or similar items, it is necessary to discard the entire support rack. This problem is particularly significant with respect to open mesh grills having wire screen since wire screen can become easily damaged or clogged.

The device of the present invention overcomes these and other problems with racks for supporting cakes, pastries and similar items for cooling. The device has a metal frame of conducting material within which a fine wire screen is fixedly, but removably positioned. The frame and the screen provide a continuous rack surface which provides good support for cakes, pastries or similar items. The fine wire mesh screen permits the free flow of air on all sides of a cake, pastry or similar item while providing good support for the entire surface of the cake, pastry or item being supported. There is no tendency for the cake, pastry or similar item to crumble and the screen does not significantly mark or indent the surface of the cake, pastry or similar item being supported.

The frame and screen are maintained above the surface on which the support rack is placed by legs which extend downward from the frame and which maintain the frame and screen at a fixed distance above the supporting surface so as to permit the free flow of air through the wire mesh to the surface of the cake, pastry or other item being supported. The legs are attached to the frame so as not to distort the upper surface of the frame and cause a protrusion in the smooth surface provided by the frame and the screen.

When the screen becomes damaged or otherwise unusable, the screen is easily replaced. Thus, there is no necessity for completely discarding the entire support rack and the support rack of the invention possesses not only the advantage of being easy and economical to manufacture, but also the advantages of being easy to maintain and of having a relatively long useful life.

These and other features and advantages of the invention will become more clearly understood from the following detailed description and the accompanying drawings in which like characters of reference designate corresponding parts in all figures and in which.

Figure 1:
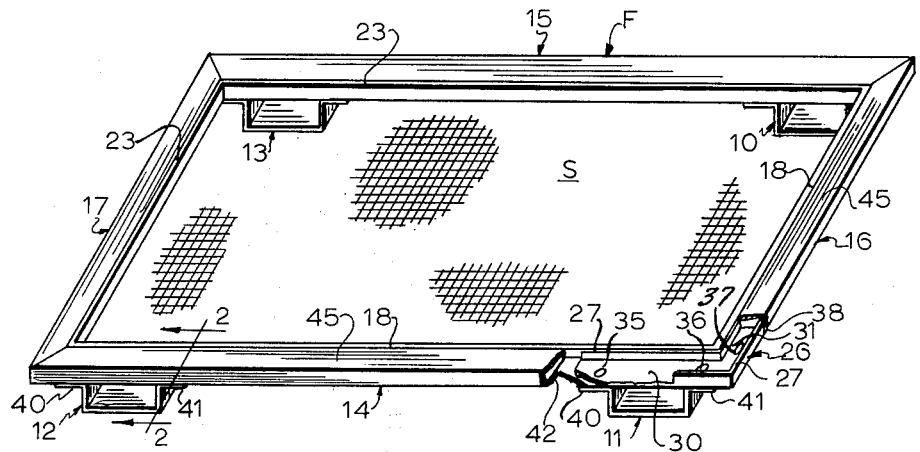
FIG. 1 is a perspective view of the support rack of the invention.

These figures and the following detailed description disclose a preferred specific embodiment of the invention, but the invention is not limited to the details disclosed since it may be embodied in other equivalent forms.

The invention is best understood as comprising a rectangular frame F supported legs 10, 11, 12 and 13 and supporting within it a screen S. The frame F has side members 14 and 15 joined at their extremities by end members 16 and 17 to form four corners. The side members 14 and 15 and the end members 16 and 17 are constructed in the identical manner and the manner in which the side member 14 is joined to the end member 16 to form a corner is identical to the manner in which the side member 14 is joined to the end member 17 and in which the side member 15 is joined to the end members 16 and 17 to form corners. Accordingly, only the construction of the side member 14 and the manner in which the side member 14 is joined to the end member 16 to form a corner will be discussed in detail below. However, it will be understood that the discussion is applicable to the construction of the side member 15 and the end members 16 and 17 and to the manner in which all corners are formed by the side members 14 and 15 and the end members 16 and 17.

Figure 2:
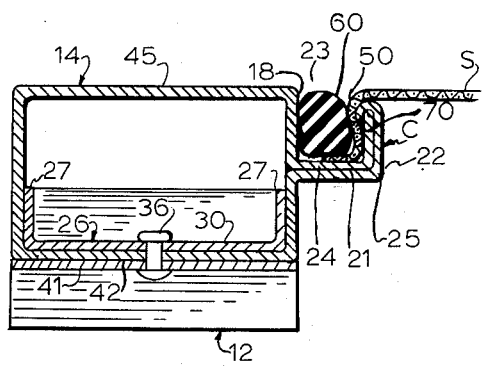
FIG. 2 is an enlarged section view taken substantially in the line 2—2 in FIG. 1.

FIG. 2 is a cross sectional view through the side member 14 and shows that the side member 14 is a hollow tube. In cross section, the side member 14 is substantially rectangular. Integral with the inner wall 18 of the side member 14 is a channel member C which has a horizontal portion 21 extending from the inner wall 18 of the side member 14 toward the side member 15 and a vertical portion 22 extending upward parallel to the inner wall 18 of the side member 14. The inner wall 18 of the side member 14 and the vertical portion 22 of the channel member C form a channel 23 extending the length of the inner wall 18 of the side member 14.

It has been found convenient to form the side member 14 and the channel member C from a single piece of aluminum or similar material by making the upper portion of the inner wall 18 continuous with an inner layer 24 of the channel member C, by making the lower portion of the inner wall 18 continuous with an outer layer 25 of the channel member C, and by locking the outer layer 25 of the channel member C over the inner layer 24. This method of construction permits the side member 14 and channel member C to be conveniently and inexpensively manufactured.

The side member 14 is mitered at both ends and is joined to the end member 16 by a corner plate 26. It will be understood that there is a corner plate 26 at each corner of the frame F. The corner plate 26 is a substantially flat plate formed by legs 30 and 31 which together form a right angle. The leg 30 is substantially as wide as the interior of the side member 14 and the leg 31 is substantially as wide as the interior of the end member 16. The side member 14 is joined to the end member 16 to form a corner by placing the leg 30 in the interior of the side member 14 and the leg 31 in the interior of the end member 16 and by abutting the mitered end of the side member 14 against the mitered end of the end member 16.

The corner plate 26 has flanges 27 extending upward and parallel to the inner walls 18 of the side member 14 and the end member 16 when the corner plate 26 is positioned within the side member 14 and the end member 16 in the manner described above. These flanges 27 serve to increase the rigidity of the corner plate 26 and of the corners of the frame F at which positioned.

The leg 11 is positioned at that end of the side member 14 adjacent to the end member 16 and the leg 12 is positioned at that end of the side member 14 adjacent to the end member 17. The leg 11 is identical to the leg 12 and to the legs 10 and 13 which are attached to the side member 15 and only the leg 11 and its manner of attachment to the side member 14 will be described. However, it will be understood that the legs 10, 12 and 13 are identical to the leg 11 and are attached to the side members 14 and 15 in the same manner as the leg 11 is attached to the side member 14.

The leg 11 is a strip of metal such as aluminum formed into a substantially U-shape and having flanges 40 and 41 extending in opposite directions. It is with the flanges 40 and 41 that the leg 11 is attached to the side member 14. An explosive rivet 35 is inserted through the flange 40, the bottom 42 of the side member 14 and the corner plate 26. Similarly, an explosive rivet 36 is inserted through the flange 41, the bottom 42 of side member 14, and the corner plate 26.

The rivets 35 and 36 serve both to attach the leg 11 to the side member 14 and to fixedly position the corner plate 26 within the side member 14. A rivet 37 is inserted through the bottom 38 of the end member 16 and the corner plate 26 to permanently position the corner plate 26 within the end member 16. Thus, the rivets 35, 36 and 37 serve to maintain the position of the corner plate 26 in the side member 14 and the end member 16 so as to permanently hold the side member 14 in the proper position with respect to the end member 16 to form the corner between the side member 14 and the end member 16.

The rivets 35, 36 and 37 are explosive rivets of known type which permit the insertion and fixing of the rivets from one side. However, it will be understood that other types of rivets and fastening means insertable from one side only may be used and that regardless of the fastening means of this type used, the attaching of the leg 11 and the positioning of corner plate 26 will not result in a bump or other protrusion in the upper surface 45 of the side member 14 or the end member 16.

The result of this frame F construction is a frame F having an upper surface 45 which is smooth so as not to cause indentations or marks in cakes, pastries or similar items; having a channel 23 adjacent to the inner walls 18 of the side members 14 and 15 and end members 16 and 17; and having legs 10, 11, 12 and 13 for supporting it on and above a supporting surface such as a table (not shown). It is within the frame F that the screen S is positioned by inserting its outer edges 50 into the channels 23. The screen S may be of any fine wire mesh screen material such as aluminum and is inserted in the frame F by simply bending its outer edges 50 downward into the channel 23 along the entire periphery of the screen S. The height of the vertical portions 22 of the channel members C is such that when the screen S is extending over the vertical members 22 and down into the channels 23, the screen S lies in the same horizontal plane with the upper surface 45 of the frame F. Thus, the screen S and the frame F provide a substantially continuous horizontal surface.

The edges 50 of the screen S are maintained in the channels 23 by a continuous cord 60 of resilient material such as rubber which is wedged into the channels 23 between the walls 18 of the side members 14 and 15 and end members 16 and 17 and the vertical portions 22 of the channel members C extending parallel to the walls 18. The edges 50 of the screen S extend downward along the inner surfaces of the vertical portions 22 and along the horizontal portions 21 of channel members C and the cord 60 engages the edges 50 as they extend downward along the vertical portions 22 and along the horizontal portions 21. This insures that the edges 50 remain firmly fixed in the channels 23. Moreover, when the side members 14 and 15 and end members 16 and 17 are constructed as described above, the lapping of the outer layer 25 of the channel member C over the inner layer 24 of the channel member C serves to form a ridge 70 in the channel members C above the cord 60 which tends to hold the cord 60 in the channels 23 and which further restricts any tendency of the edges 50 to be pulled from the channels 23.

The fine wire mesh of the screen S provides uniform support to a cake, pastry, or similar item and it has been found that a fine wire mesh screen of aluminum has a relatively long useful life even when used to support relatively heavy items such as cakes. However, the manner in which the screen S is positioned in the frame F makes the screen S relatively easy to change. The screen S is changed by simply forcing the cord 60 from the channels 23 and then pulling the edges 50 of the screen S from the channels 23. A new screen S is positioned in the frame F by simply placing its edges 50 in the channels 23 in the positions described above and then forcing the cord 60 down into the channels 23.

It will be obvious to those skilled in the art that many variations may be made in the embodiment here chosen for the purpose of illustrating the present invention without departing from the scope thereof as defined by the appended claims.

What is claimed as invention is:

1. A rack for supporting items, said rack comprising a first side member having a hollow interior and its first and second ends mitered; a second side member having a hollow interior and its first and second ends mitered, said second side member being parallel to and spaced apart from said first side member; a first end member having a hollow interior, its first end mitered and abutting the first end of the first side member, and its second end mitered and abutting the first end of the second side member; a second end member having a hollow interior, its first end mitered and abutting the second end of the first side member, and its second end mitered and abutting the second end of the second side member, said second end member being parallel to and spaced apart from said first end member and forming with said first end member, said first side member, and said second side member a rectangular frame with an inner wall defining a rectangular space; a first corner plate having a first leg within the hollow interior of the first side member and a second leg within the hollow interior of the first end member; a second corner plate having a first leg within the hollow interior of the first side member and a second leg within the hollow interior of the second end member; a third corner plate having a first leg within the hollow interior of the second side member and a second leg within the hollow interior of the first end member; a fourth corner plate having a first leg within the hollow interior of the second side member and a second leg within the hollow interior of the second end member; a first support leg extending downward from said first side member and having a first flange engaging the first side member adjacent to the first end member and a second flange engaging the first side member more remote from the first end member than its first flange; a second support leg extending downward from first side member and having a first flange engaging the first side member adjacent to the second end member and a second flange engaging the first side member more remote from the second end member than its first flange; a third suport leg extending downward from said second side member and having a first flange engaging the second side member adjacent to the first end member and a second flange engaging the second side member more remote than the first end member than its first flange; a fourth support leg extending downward from said second side member and having a first flange engaging the second side member adjacent to the second end member and a second flange engaging the second side member more remote from the second end member than its first flange; a first rivet extending through the first flange of the first support leg, the first side member, and the first corner plate and terminating within the hollow interior of the first side member; a second rivet extending through the second flange of the first support leg, the first side member, and the first corner plate and terminating within the hollow interior of the first side member; a third rivet extending through the first flange of the second support leg, the first side member, and the second corner plate and terminating within the hollow interior of the first side member; a fourth rivet extending through the second flange of the second support leg, the first side member, and the second corner plate and terminating within the hollow interior of the first side member; a fifth rivet extending through the first flange of the third support leg, the second side member, and the third corner plate and terminating within the hollow interior of the second side member; a sixth rivet extending through the second flange of the third support leg, the second side member, and the third corner plate and terminating within the hollow interior of the second side member; a seventh rivet extending through the first flange of the fourth support leg, the second side member, and the fourth corner plate and terminating within the hollow interior of the second side member; an eighth rivet extending through the second flange of the fourth support leg, the second side member, and the fourth corner plate and terminating within the hollow interior of the second side member; a ninth rivet extending through the first end member and the first corner plate and terminating within the hollow interior of the first end member; a tenth rivet extending through the first end member and the third corner plate and terminating within the hollow interior of the first end member; an eleventh rivet extending through the second end member and the second corner plate and terminating within the hollow interior of the second end member; a twelfth rivet extending through the second end member and the fourth corner plate and terminating within the hollow interior of the second end member; a channel member extending the length of the said inner wall, said channel member having a horizontal portion extending from said inner wall and a vertical portion continuous with said horizontal portion and extending upward parallel to said inner wall to form with the horizontal portion a channel adjacent to said inner wall, said vertical portion of said channel member having a shoulder at its upper edge between the said vertical portion and the said inner wall; a screen having closely spaced mesh and having its outer edge extending downwardly along the vertical portion of the channel member between said channel member and said inner wall and across the horizontal portion of the said channel member toward the said inner wall; and a continuous cord inserted between the said inner wall and the vertical portion of the said channel member, said cord forcing the outer edge of the said screen against the vertical portion and the horizontal portion of the said channel member below the said shoulder.

2. A rack for supporting items, said rack comprising a first side member; a second side member parallel to and spaced apart from said first side member; a first end member; a second end member parallel to and spaced apart from said first end member and forming with said first end member, said first side member, and said second side member a rectangular frame with an inner wall defining a rectangular space; a first corner plate joining the first side member to the first end member, a second corner plate joining the first side member to the second end member; a third corner plate joining the second side member to the first end member; a fourth corner plate joining the second side member to the second end member; a first support leg attached to and extending downward from the first side member adjacent to the first end member; a second support leg attached to and extending downward from the first side member adjacent to the second end member; a third support leg attached to and extending downward from the second side member adjacent to the first end member; a fourth support leg attached to and extending downward from the second side member adjacent to the second end member; a channel member extending the length of the said inner wall, said channel member having a horizontal portion extending from said inner wall and a vertical portion continuous with said horizontal portion and extending upward parallel to said inner wall to form with the horizontal portion a channel adjacent to said inner wall, said vertical portion of said channel member having a shoulder at its upper edge between the said vertical portion and the said inner wall; a screen having closely spaced mesh and having its outer edge extending downwardly along the vertical portion of the channel member between said channel member and said inner wall and across the horizontal portion of the said channel member toward the said inner wall; and a continuous cord inserted between the said inner wall and the vertical portion of the said channel member, said cord forcing the outer edge of the said screen against the vertical portion and the horizontal portion of the said channel member below the said shoulder.

3. A rack for supporting items above a support surface, said rack comprising a rectangular frame with an inner wall defining a rectangular space; a plurality of support legs extending downward from said frame and positioned on said frame to maintain the said frame parallel to and above the said support surface; a channel member extending the length of the inner wall of the said frame, said channel member having a horizontal portion extending from said inner wall and a vertical portion continuous with said horizontal portion and extending upward parallel to the said inner wall to form with the horizontal portion a channel adjacent to said inner wall, said vertical portion having a shoulder at its upper edge between said vertical portion and the said inner wall; a screen having closely spaced mesh and having its outer edge extending downward along the vertical portion of the said channel member between the said vertical portion and the said inner wall of the frame and across the horizontal portion of the said channel member toward the said inner wall of the frame; and a continuous cord inserted between the inner wall of the said frame and the vertical portion of the said channel member, said cord being positioned to force the outer edge of the said screen against the vertical portion of the channel member below the said shoulder and against the horizontal portion of the said channel member.

4. A rectangular supporting device comprising two hollow side members and two hollow end members each connected together at their ends to form a rectangle, corner plates each received within the hollow portion of one of said side members and one of said end members to join said side members and said end members together, support legs positioned at each end of each of said hollow side members, first rivet means fastening said respective hollow side members, corner plates and support legs together, second rivet means fastening said respective hollow end members and corner plates together, and said hollow side members and said hollow end members further defining a continuous U-shaped channel extending around the inner portion of said rectangle, said U-shaped channel being narrower near its opening than at its base.

References Cited by the Examiner

UNITED STATES PATENTS

| | | | |
|---|---|---|---|
| 1,334,409 | 3/20 | Sindelar | 108—51 |
| 1,489,216 | 4/24 | Hurst | 108—24 |
| 1,772,780 | 8/30 | Milone | 160—395 |
| 1,809,418 | 6/31 | McCarthy | 108—24 X |
| 1,893,830 | 1/33 | Turner | 160—395 |
| 2,245,961 | 6/41 | Clay | 160—395 |
| 2,535,528 | 12/50 | Brodbeck | 108—51 X |
| 2,797,750 | 7/57 | Van Dette | 160—392 |
| 2,897,973 | 8/59 | Sizemore | 108—24 |

FRANK B. SHERRY, *Primary Examiner*.